United States Patent
Ku et al.

(10) Patent No.: US 10,194,449 B2
(45) Date of Patent: Jan. 29, 2019

(54) BASE STATION, SIGNAL SYNTHESIS METHOD, AND SIGNAL FORWARDING METHOD

(71) Applicant: Panasonic Intellectual Property Management Co., Ltd., Osaka (JP)

(72) Inventors: Richol Ku, Kanagawa (JP); Yuta Seki, Kanagawa (JP); Seigo Nakao, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 14 days.

(21) Appl. No.: 15/503,178

(22) PCT Filed: Dec. 24, 2015

(86) PCT No.: PCT/JP2015/006439
§ 371 (c)(1),
(2) Date: Feb. 10, 2017

(87) PCT Pub. No.: WO2016/113827
PCT Pub. Date: Jul. 21, 2016

(65) Prior Publication Data
US 2017/0238327 A1    Aug. 17, 2017

(30) Foreign Application Priority Data
Jan. 13, 2015  (JP) .................................. 2015-004266

(51) Int. Cl.
*H04W 72/08*    (2009.01)
*H04W 16/28*    (2009.01)
(Continued)

(52) U.S. Cl.
CPC .......... *H04W 72/082* (2013.01); *H04B 7/024* (2013.01); *H04B 7/026* (2013.01);
(Continued)

(58) Field of Classification Search
CPC ........... H04W 72/082; H04W 72/0446; H04W 72/0413; H04W 16/28; H04W 28/04;
(Continued)

(56) References Cited

U.S. PATENT DOCUMENTS 8,019,288 B2 *  9/2011  Yu .......................... H04B 7/022
                                                     370/279
8,145,733 B1 *  3/2012  Cheng ................. H04L 61/2514
                                                     709/220
(Continued)

FOREIGN PATENT DOCUMENTS

JP    2011-101358 A    5/2011
JP    2012-520640 A    9/2012

OTHER PUBLICATIONS

3GPP TR 36.819 B11.2.0, "3$^{rd}$ Generation Partnership Project; Technical Specification Group Radio Access Network; Coordinated multi-point operation for LTE physical layer aspects (Release 11)," Sep. 2013, 70 pages.
(Continued)

*Primary Examiner* — Mounir Moutaouakil
(74) *Attorney, Agent, or Firm* — Seed IP Law Group LLP (57) ABSTRACT

A base station receives signals transmitted from one terminal in cooperation with another base station and performs synthesis processing of the received signals of the other base station and the received signals of the local base station. In the base station, a determination circuit determines necessity of synthesis processing using the received signals of the local base station at the time of the first transmission of the terminal. A base station-to-base station communication circuit transmits a message requesting forwarding of the received signals to the other base station in a case where the synthesis processing is determined to be necessary and receives the forwarded signals that are forwarded from the other base station at the time of retransmission of the
(Continued)

terminal. A synthesis circuit synthesizes the forwarded signals from the other base station and the received signals of the local base station in a case where the synthesis processing is determined to be necessary.

5 Claims, 5 Drawing Sheets (51) Int. Cl.
H04W 28/04 (2009.01)
H04B 7/024 (2017.01)
H04L 1/00 (2006.01)
H04L 1/08 (2006.01)
H04L 5/00 (2006.01)
H04W 72/04 (2009.01)
H04L 1/06 (2006.01)
H04L 1/18 (2006.01)
H04B 7/026 (2017.01)
H04B 7/08 (2006.01)
H04W 88/08 (2009.01)

(52) U.S. Cl.
CPC ......... *H04B 7/0885* (2013.01); *H04L 1/0045* (2013.01); *H04L 1/06* (2013.01); *H04L 1/08* (2013.01); *H04L 1/1845* (2013.01); *H04L 5/0035* (2013.01); *H04W 16/28* (2013.01); *H04W 28/04* (2013.01); *H04W 72/0413* (2013.01); *H04W 72/0446* (2013.01); *H04L 1/1829* (2013.01); *H04L 2001/0093* (2013.01); *H04L 2001/0097* (2013.01); *H04W 88/08* (2013.01)

(58) Field of Classification Search
CPC ..... H04W 88/08; H04B 7/0885; H04B 7/026; H04B 7/024; H04L 1/1829; H04L 2001/0097; H04L 1/1845; H04L 1/0045; H04L 1/06; H04L 1/08; H04L 5/0035; H04L 2001/0093

See application file for complete search history.

(56) References Cited

U.S. PATENT DOCUMENTS

| 2002/0002456 | A1* | 1/2002 | Vainio | G10L 19/005 704/258 |
| 2007/0201589 | A1* | 8/2007 | Tokoro | H04B 7/0848 375/347 |
| 2010/0317310 | A1* | 12/2010 | Mashino | H01Q 1/246 455/305 |
| 2011/0113299 | A1 | 5/2011 | Power et al. | |
| 2012/0002611 | A1* | 1/2012 | You | H04B 7/024 370/328 |
| 2012/0188932 | A1* | 7/2012 | Gong | H04B 7/026 370/312 |
| 2013/0004176 | A1* | 1/2013 | Sato | H04B 10/25754 398/96 |
| 2013/0250875 | A1 | 9/2013 | Chen et al. | |
| 2014/0295909 | A1* | 10/2014 | Ouchi | H04W 52/242 455/522 |

OTHER PUBLICATIONS

International Search Report dated Feb. 16, 2016, for corresponding International Application No. PCT/JP2015/006439, 2 pages.

* cited by examiner

BASE STATION, SIGNAL SYNTHESIS METHOD, AND SIGNAL FORWARDING METHOD

TECHNICAL FIELD

The present disclosure relates to a base station, a signal synthesis method and a signal forwarding method.

BACKGROUND ART

In Long Term Evolution (LTE), operations of Coordinated Multi-Point (CoMP) reception (hereinafter referred to as UL-CoMP) in the uplink have been studied (for example, see NPL 1). In CoMP reception, a plurality of base stations receive signals transmitted from one terminal, and synthesize the signals received in each base station to improve the reception quality of the signals.

In UL-CoMP, the received signals of each of the plurality of base stations which receive signals from the terminal in a coordinated way are forwarded to a base station performing synthesis/decoding processing. In the following description, among a plurality of base stations participating in UL-CoMP, a base station that performs synthesis/decoding processing is referred to as a "synthesizing base station" and a base station that forwards the received signals to the synthesizing base station is referred to as a "forwarding base station".

Figure 1:
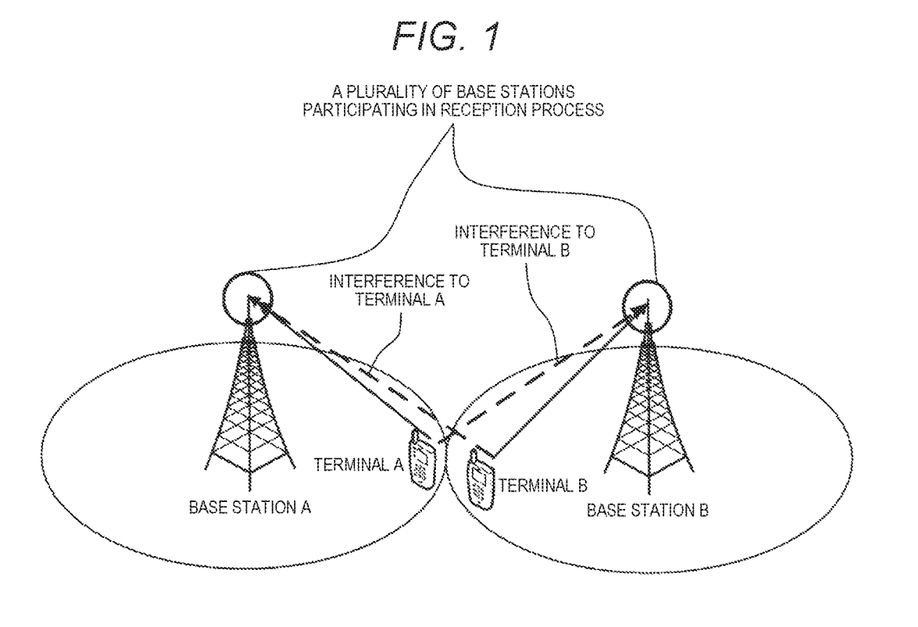
FIG. 1 illustrates an example of an environment in which application UL-CoMP is assumed.

FIG. 1 illustrates an example of an environment in which UL-CoMP may be applied. In FIG. 1, terminal A and terminal B are located in each end of coverage area (cell edge) of base station A and base station B, and connected to base station A and base station B respectively. In this case, with respect to uplink signals of terminal A, not only signal power is reduced due to the distance attenuation to base station A, but also interference caused by the uplink signals of terminal. B is generated, and thereby reception quality deteriorates. Similarly, reception quality deteriorates for the uplink signals of terminal B.

In contrast, in UL-CoMP, base station A and base station B receive uplink signals of each of terminal A and terminal B in a coordinated way and synthesize the signals received in each base station to improve reception quality of the signals.

CITATION LIST

Non Patent Literature

NPL1: 3GPP TR 36. 819 V11.2.0, Coordinated multi-point operation for LTE physical layer aspects (Release 11)

SUMMARY OF THE INVENTION

In general, the larger the size of a signal forwarded per one time from a forwarding base station to a synthesizing base station is, the more effect of improving reception quality by COIF is obtained. Further, the higher the forwarding frequency of the signal from the forwarding base station to the synthesizing base station is (the shorter the forwarding period is), the more effect of improving reception quality by CoMP is obtained. In other words, as the forwarding count is increased, greater improvement of reception quality by CoMP is expected.

However, in consideration of the load on the network, it is desirable to suppress the forwarding count of signals from the forwarding base station to the synthesizing base station as much as possible.

An object of one aspect of the present disclosure is to provide a base station, a signal synthesis method, and a signal forwarding method capable of maintaining the effect of improving reception quality by application of CoMP while reducing the signal forwarding count when CoMP is applied.

According to one aspect of the present disclosure, there is provided a base station that receives signals transmitted from one terminal in cooperation with another base station and performs synthesis processing of the received signals of the other base station and the received signals of the local base station. The base station includes a determination circuit that determines necessity of the synthesis processing using the received signals of the local base station at the time of the first transmission of the terminal, a communication circuit that transmits a message requesting forwarding of the received signals to the other base station in a case where the synthesis processing is determined to be necessary, and receives the forwarded signals that are forwarded from the other base station at the time of retransmission of the terminal, and a synthesis circuit that synthesizes the forwarded signals from the other base stations and the received signals of the local base station in a case where the synthesis processing is determined to be necessary.

According to one aspect of the present disclosure, there is provided a base station that receives signals transmitted from one terminal in cooperation with a plurality of base stations and forwards the received signals of the local base station to a synthesizing base station that performs synthesis processing of the received signals among the plurality of base stations. The base station includes a demodulation circuit that demodulates the signals transmitted from the terminal, and a communication circuit that forwards the demodulated signals to the synthesizing base station in a case where a message requesting forwarding of the received signals is received from the synthesizing base station.

According to one aspect of the present disclosure, there is provided a signal synthesis method of a synthesizing base station that receives signals transmitted from one terminal in cooperation with a synthesizing base station and another base station, and performs synthesis processing of the received signals of the other base station and the received signals of the synthesizing base station. The method includes determining necessity of the synthesis processing using the received signals of the synthesizing base station at the time of the first transmission of the terminal, transmitting a message requesting forwarding of the received signals to the other base station in a case where the synthesis processing is determined to be necessary, and receiving the forwarded signals that are forwarded from the other base station at the time of retransmission, and synthesizing the forwarded signals from the other base station and the received signals of the synthesizing base station in a case where the synthesis processing is determined to be necessary.

According to one aspect of the present disclosure, there is provided a signal forwarding method of a base station that receives signals transmitted from one terminal in cooperation with a plurality of base stations, and forwards the received signals of the local base station to a synthesizing base station that performs synthesis processing of the received signals among the plurality of base stations. The method includes demodulating the signals transmitted from the terminal, and forwarding the demodulated signals to the synthesizing base station in a case where a message requesting forwarding of the received signals is received from the synthesizing base station.

According to one aspect of the present disclosure, it is possible to maintain the effect of improving reception quality by application of CoMP while reducing the signal forwarding count when CoMP is applied.

DESCRIPTION OF EMBODIMENTS

Exemplary Embodiment 1

Hereinafter, an exemplary embodiment of the present disclosure will be described in detail with reference to the drawings. In the following, a process of UL-CoMP that is closely related to an invention according to one aspect of the present disclosure will be described and the description for other processes will be omitted.

[Configuration of Communication System]

Figure 2:
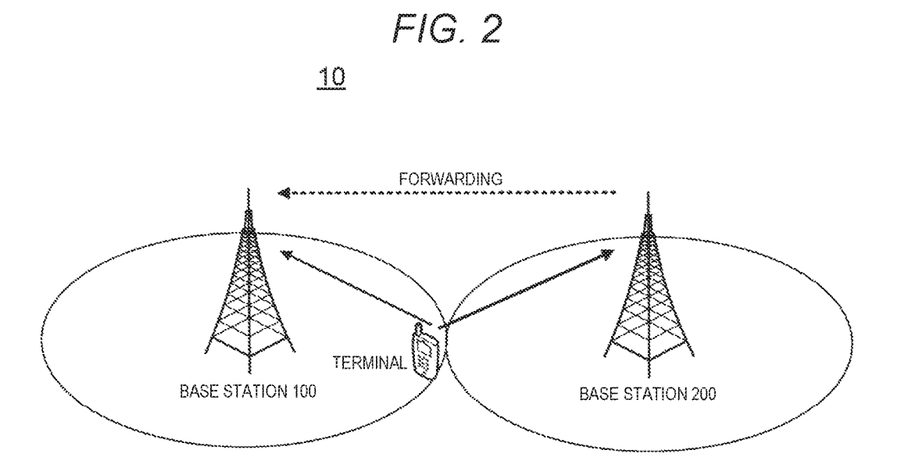
FIG. 2 is a diagram illustrating a configuration of a communication system according to Exemplary Embodiment 1.

FIG. 2 is a diagram illustrating a configuration of a communication system according to an exemplary embodiment of the present disclosure.

Communication system 10 according to the exemplary embodiment includes at least one terminal and a plurality of base stations. UL-CoMP can be applied in communication system 10 and a plurality of base stations participating in UL-CoMP (Comp cooperation set) receive signals transmitted from a terminal in a coordinated way. Base station 100 which is one base station among a plurality of base stations is a "synthesizing base station" that performs synthesis processing of the received signals received at the plurality of base stations. Another base station 200 which is other than the base station 100 is a "forwarding base station" that forwards the received signals to the synthesizing base station. Base station 100 is, for example, a base station for transmitting control information to the terminal.

In FIG. 2, two base stations are illustrated as an example of a plurality of base stations participating in UL-COMP, but the present disclosure is not limited thereto. UL-CoMP may be applied in three or more base stations. In this case, the plurality of base stations consist of one synthesizing base station and two or more forwarding base stations.

[Configuration of Base Station 100]

Figure 3:
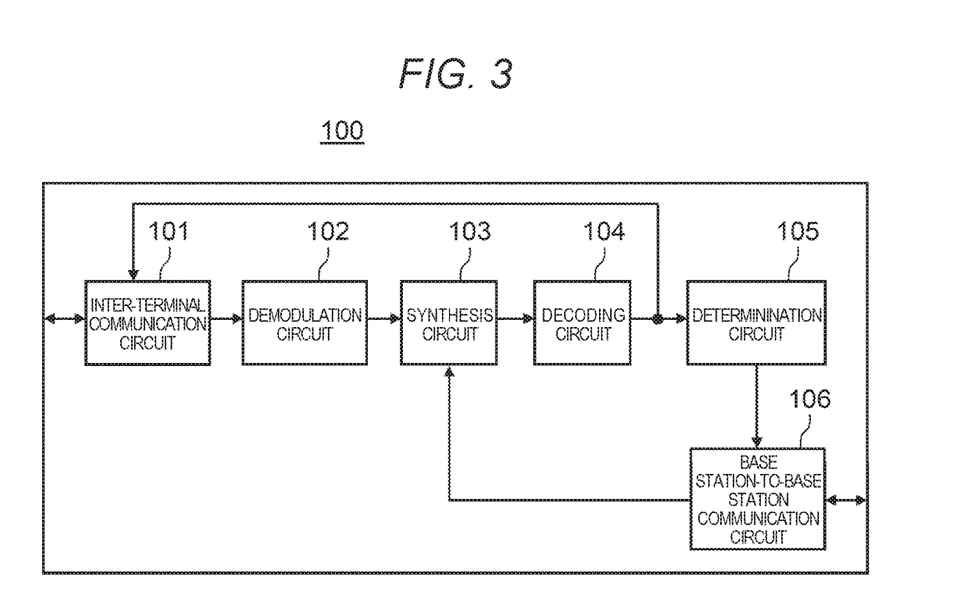
FIG. 3 is a block diagram illustrating a configuration of a base station which is a synthesizing base station according to Exemplary Embodiment 1.

FIG. 3 is a block diagram illustrating a configuration of base station 100 which is a synthesizing base station according to the exemplary embodiment.

Base station 100 illustrated in FIG. 3 is provided with inter-terminal communication circuit 101, demodulation circuit 102, synthesis circuit 103, decoding circuit 104, determination circuit 105, and base station-to-base station communication circuit 106.

Inter-terminal communication circuit 101 communicates with terminals. Specifically, inter-terminal communication circuit 101 receives a signal transmitted from a terminal (uplink signal), and outputs the received signal to demodulation circuit 102. In addition, inter-terminal communication circuit 101 receives a response signal indicating an error detection result for the signal received from the terminal (ACK (no error) or NACK (error found) from decoding circuit 104, and transmits the signal to a corresponding terminal.

Demodulation circuit 102 performs demodulation processing for the received signal received from inter-terminal communication circuit 101, and outputs a demodulated signal to synthesis circuit 103.

At the time of the first transmission of each terminal, synthesis circuit 103 outputs the signal received from demodulation circuit 102 to decoding circuit 104, and stores the signal. At the time of retransmission of each terminal, synthesis circuit 103 synthesizes the signal received from demodulation circuit 102 (retransmitted signal), the signal received from base station-to-base station communication circuit 106 (forwarded signal from a forwarding base station), and the signal stored in synthesis circuit 103 (synthesized signal). Then, synthesis circuit 103 outputs a synthesized signal to decoding circuit 104, and stores the synthesized signal.

Decoding circuit 104 performs decoding processing for the signal received from synthesis circuit 103, obtaining a decoded signal. Further, decoding circuit 104 performs error detection processing for the decoded signal and generates a response signal according to an error detection result (ACK, MACK). Decoding circuit 104 outputs the response signal which is a result of decoding to inter-terminal communication circuit 101 and determination circuit 105.

Determination circuit 105 determines necessity of the synthesis processing for the received signal that a plurality of base stations including base station 200 as the forwarding base station have received, based on a result of decoding received from decoding circuit 104. For example, in a case where the result of decoding received from decoding circuit 104 is a NACK, determination circuit 105 determines that synthesis processing of the received signal is necessary. In a case where synthesis processing of the received signal is determined to be necessary, determination circuit 105 outputs a message requesting forwarding of the received signal to the forwarding base station (forwarding request message) to base station-to-base station communication circuit 106.

Base station-to-base station communication circuit 106 communicates with base station 200. Specifically base station-to-base station communication circuit 106 transmits the forwarding request message received from determination circuit 105 to base station 200. Further, base station-to-base station communication circuit 106 receives the forwarded signal that is forwarded from base station 200 at the time of retransmission of the terminal, and outputs the received forwarded signal to synthesis circuit 103. Communication between base station 100 and base station 200 is performed, for example, by using X2 interface.

[Configuration of Base Station 200]

Figure 4:
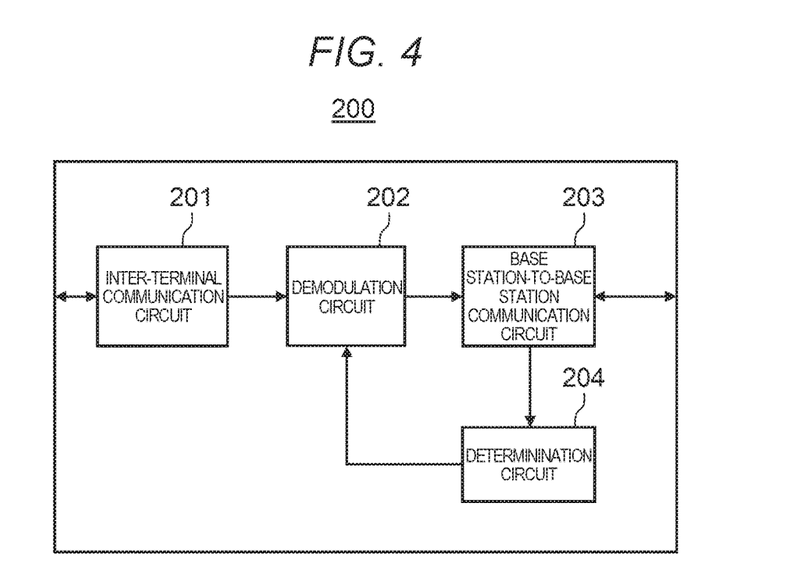
FIG. 4 is a block diagram illustrating a configuration of a base station which is a forwarding base station according to Exemplary Embodiment 1.

FIG. 4 is a block diagram illustrating a configuration of base station 200 which is a forwarding base station according to the exemplary embodiment.

Base station 200 illustrated in FIG. 4 is provided with inter-terminal communication circuit 201, demodulation circuit 202, base station-to-base station communication circuit 203, and determination circuit 204.

Inter-terminal communication circuit 201 communicates with terminals. Specifically inter-terminal communication circuit 201 receives a signal transmitted from a terminal (uplink signal), and outputs the received signal to demodulation circuit 202.

Demodulation circuit 202 performs demodulation processing for the received signal received from inter-terminal communication circuit 201. Further, in a case where there is an instruction of forwarding from determination circuit 204, demodulation circuit 202 outputs a demodulated signal to base station-to-base station communication circuit 203.

Base station-to-base station communication circuit 203 communicates with base station 100. Specifically base station-to-base station communication circuit 203 receives a message transmitted from base station 100, and outputs the message to determination circuit 204. In addition, base station-to-base station communication circuit 203 transmits (forwards) the signal received from demodulation circuit 202 to base station 100.

In a case where a message requesting forwarding of the received signal is included in the messages received from base station-to-base station communication circuit 203, determination circuit 204 instructs demodulation circuit 202 to forward the demodulated signal.

[Operation of Base Station 100 and Base Station 200]

Next, detailed description of operations of base station 100 and base station 200 described above will be followed.

Figure 5:
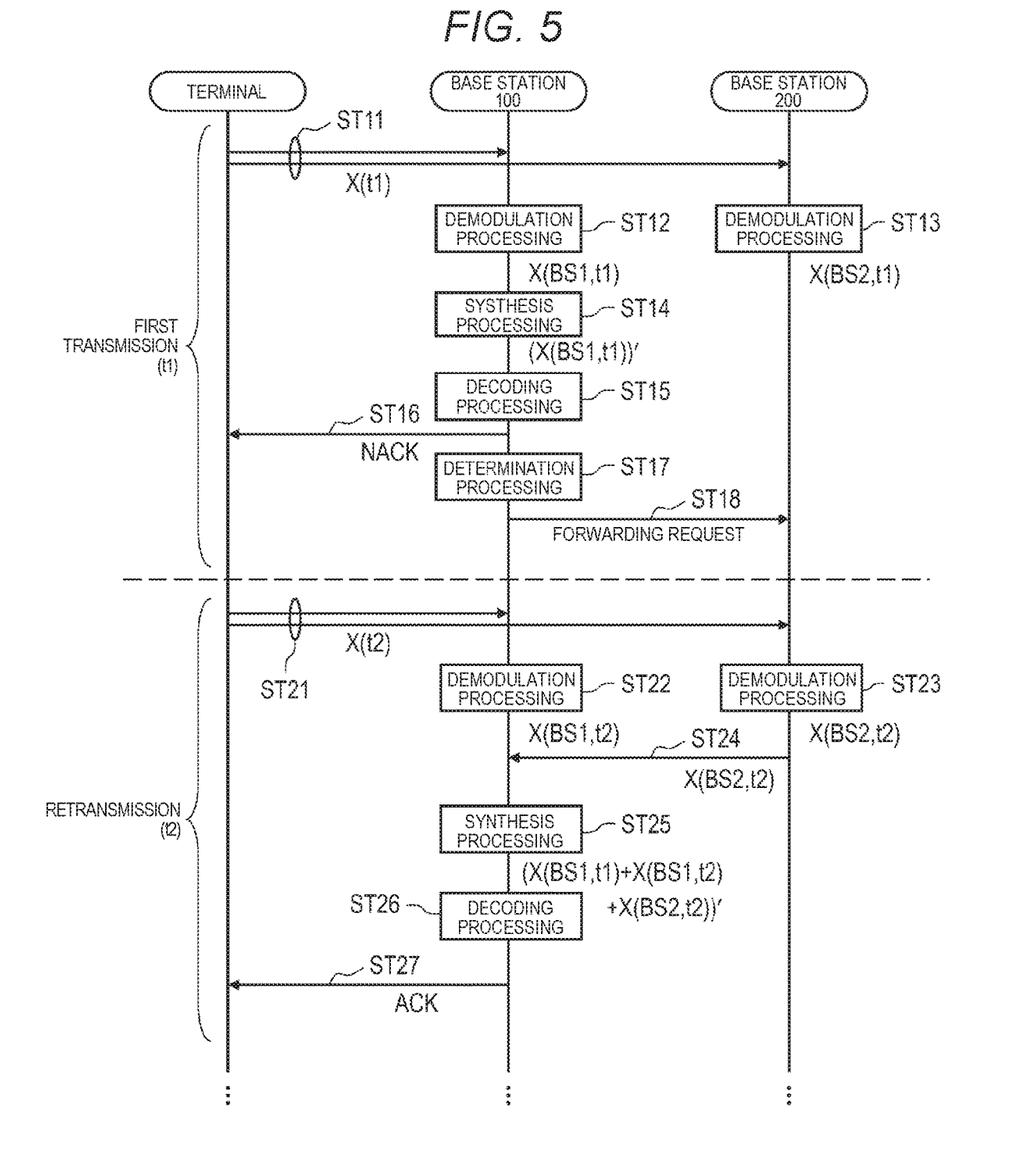
FIG. 5 is a sequence diagram illustrating an operation of a base station according to Exemplary Embodiment 1.

FIG. 5 is a sequence diagram illustrating an example of a process of transmitting and receiving uplink signals according to the exemplary embodiment.

In FIG. 5, step (hereinafter, referred to as "ST") 11 to ST18 show an operation of the first transmission of a terminal, ST21 to ST27 show an operation at the time of retransmission of the terminal.

In ST11, the terminal transmits uplink signal X(t1), and base station 100 and base station 200 receive uplink signal X(t1).

In ST12, base station 100 performs demodulation processing for uplink signal X(t1) received in STU, obtaining demodulated signal X(BS1,t1).

In ST13, base station 200 performs demodulation processing for uplink signal X(t1) received in ST11, obtaining demodulated signal X(BS2,t1).

In ST14, base station 100 performs synthesis processing for demodulated signal X(BS1,t1) obtained in ST12. However, since only signal X(BS1,t1) is received at the time of the first transmission, base station 100 stores signal X(BS1, t1) as synthesized signal X(BS1,t1)' without any change.

In ST15, base station 100 performs decoding processing for synthesized signal (X(BS1,t1))', detecting whether or not there is an error. In FIG. 5, base station 100 outputs a NACK as a result of decoding.

In ST16, base station 100 transmits a NACK to the terminal.

In ST17, base station 100 determines necessity of the synthesis processing by CoMP processing based on the result of decoding in ST15. That is, at the time of the first transmission, base station 100 determines necessity of the synthesis processing by CoMP processing using the received signal of the local base station. In FIG. 5, since a NACK is obtained in ST15, base station 100 determines that synthesis processing by CoMP processing is necessary.

In ST18, base station 100 transmits a forwarding request message requesting forwarding of the received signal to base station 200. That is, base station 100 transmits the forwarding request message requesting forwarding of the received signal to base station 200 in a case where synthesis processing by CoMP processing is determined to be necessary.

At the time of retransmission, in ST21, the terminal transmits uplink signal X(t2), and base station 100 and base station 200 receive uplink signal X(t2).

In ST22, base station 100 performs demodulation processing for uplink signal X(t2) received in ST21, obtaining demodulated signal X(BS1,t2).

In ST23, base station 200 performs demodulation processing for uplink signal X(t2) received in ST21, obtaining demodulated signal X(BS2,t2).

Since a forwarding request message is received in ST18, base station 200 forwards demodulated signal X(BS2,t2) obtained in ST23 to base station 100 in ST24. That is, in a case where synthesis processing by CoMP processing is determined to be necessary, base station 100 receives the forwarded signal that is forwarded from base station 200 at the time of retransmission.

In ST25, base station 100 performs synthesis processing using demodulated signal X(BS1,t2) obtained in ST22, signal X(BS2,t2) forwarded from base station 200 in ST24, and signal (X(BS1,t1))' stored at the time of the first transmission, obtaining synthesized signal (X(BS1,t1)+X(BS1, t2)+X(BS2,t2))'. In other words, in a case where synthesis processing by CoMP processing is determined to be necessary, base station 100 synthesizes the forwarded signal from base station 200 and the received signal of base station 100.

In ST26, base station 100 performs decoding processing for synthesized signal (X(BS1,t1)+X(BS1,t2)+X(BS2,t2))', detecting whether or not there is an error. In FIG. 5, base station 100 outputs an ACK as a result of decoding.

In ST27, base station 100 transmits an ACK to the terminal.

As described above, at the time of the first transmission of the terminal, base station 100 which is a synthesizing base station performs reception processing using the received signal of base station 100 only. In addition, at the time of the first transmission, base station 100 determines necessity of the synthesis processing by CoMP processing using the received signal of base station 100. Then, in a case where synthesis processing is determined to be necessary, base station 100 transmits a message requesting forwarding of the received signal to base station 200, and receives the forwarded signal that is forwarded from the base station 200 at the time of retransmission.

That is, at the time of the first transmission of the terminal, base station 200 does not forward the received signal that base station 200 received. Further, in a case where synthesis processing is determined to be necessary using the received signal of base station 100 at the time of the first transmission, base station 100 synthesizes the forwarded signal from base station 200 and the received signal of base station 100 at the time of retransmission.

For example, in a case where base station 100 properly performs decoding by using the signal received from the terminal in base station 100 only forwarding processing of the received signal forwarded from base station 200 becomes wasted. In contrast, according to the exemplary embodiment, it is possible to reduce the signal forwarding count as much as the data that is not be forwarded from the forwarding base station at the time of the first transmission. That is, in a case where it is determined that there is no error by using the received signal of the synthesizing base station only at the time of the first transmission of the terminal, it is possible to prevent wasteful forwarding from the forwarding base station.

On the other hand, in a case where it is determined that there is an error by using the received signal of the synthesizing base station only at the time of the first transmission of the terminal, UL-CoMP is applied at the time of retransmission, and a plurality of base stations (base station 100 and base station 200) perform synthesis processing and it is possible to improve the reception quality of the signal.

According to +, it is possible to maintain the effect of improving reception quality by application of CoMP while reducing the signal forwarding count when CoMP is applied.

Exemplary Embodiment 2

The basic configuration of a synthesizing base station according to the exemplary embodiment is the same as in Exemplary Embodiment 1, a synthesizing base station will be described with reference to base station 100 in FIG. 3.

Figure 6:
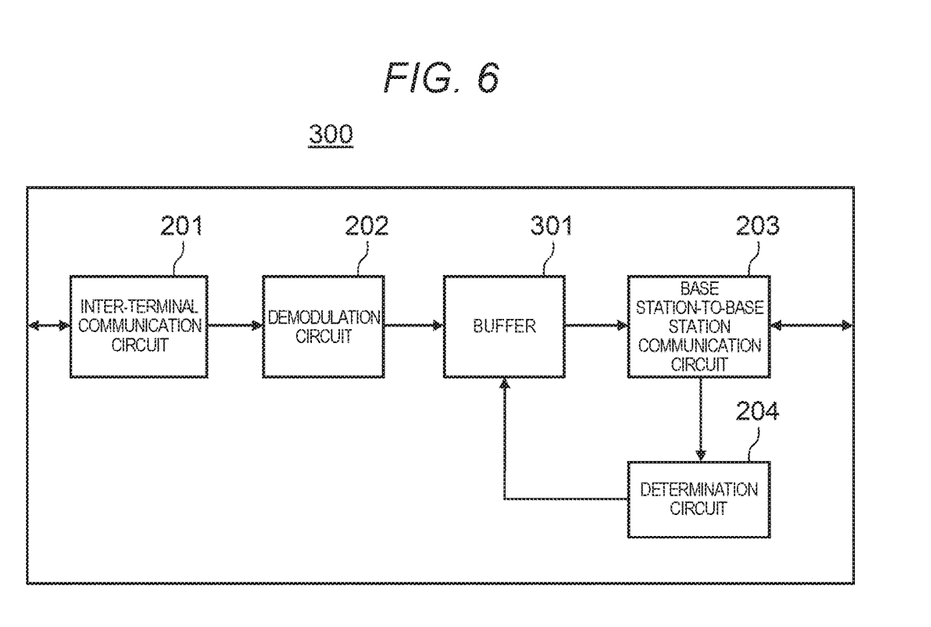
FIG. 6 is a block diagram illustrating a configuration of a base station which is a forwarding base station according to Exemplary Embodiment 2.

FIG. 6 is a block diagram illustrating a configuration of base station 300 which is a forwarding base station according to the exemplary embodiment. In FIG. 6, the same reference marks are given to the same configuration as base station 200 of Exemplary Embodiment 1 in FIG. 4, description thereof will be omitted.

In base station 300 illustrated in FIG. 6, buffer 301 performs synthesis processing each time it receives a demodulated signal from demodulation circuit 202, and stores a synthesized signal. Buffer 301 is, for example, a circular buffer and synthesizes a logarithm likelihood ratio (LLR: Log-Likelihood Ratio) calculated from the received signal as the demodulated signal. In a case where an instruction of forwarding is received from determination circuit 204, buffer 301 outputs the synthesized signal (LLR) that is being stored to base station-to-base station communication circuit 203. Thus, at the time of retransmission, LLR is forwarded to the synthesizing base station (base station 100). That is, a forwarded signal that is forwarded from base station 300 is the signal obtained by synthesizing the signals that have been received from the first transmission until the current retransmission in base station 300.

[Operation of Base Station 100 and Base Station 300]

Next, detailed description of operations of base station 100 and base station 300 described above will be followed.

Figure 7:
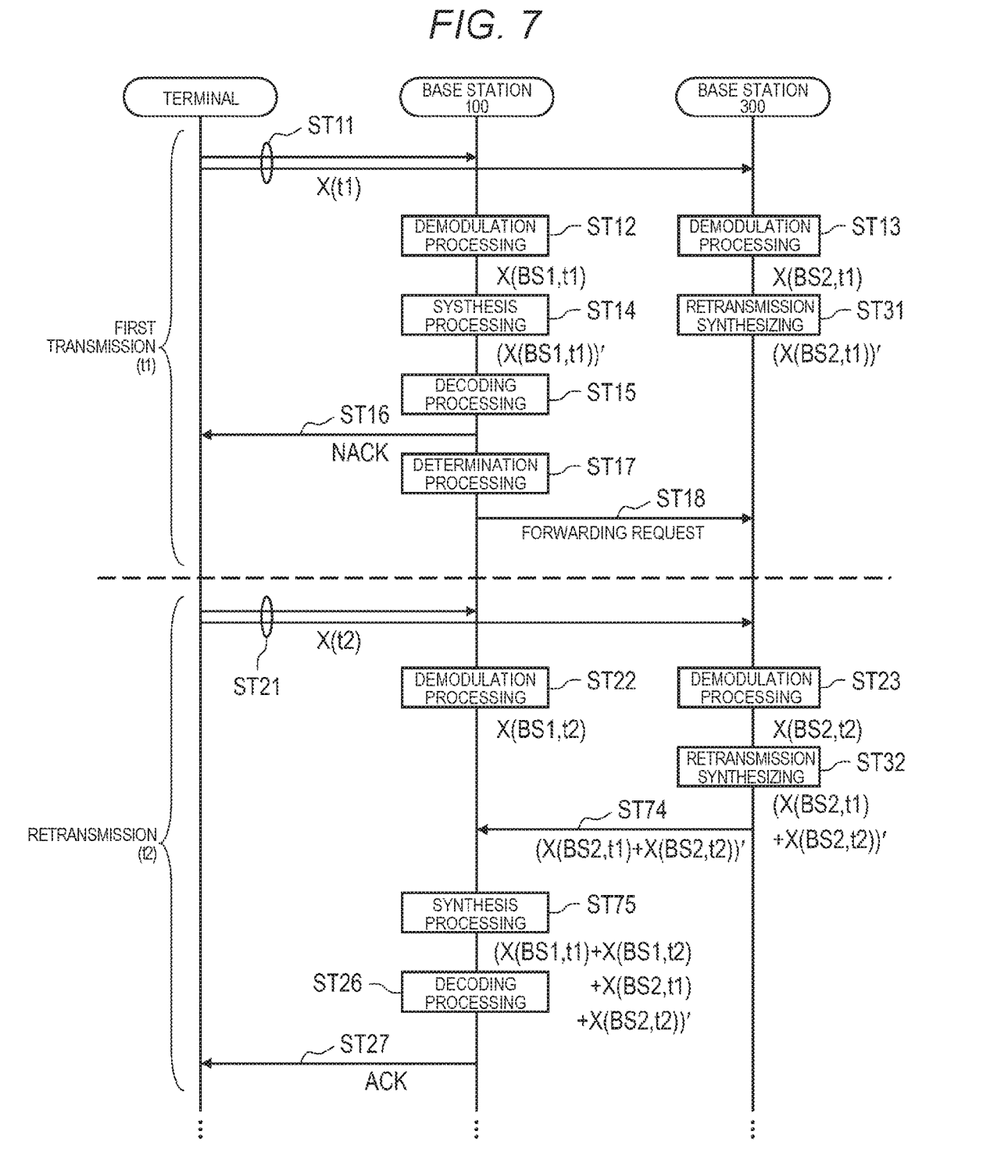
FIG. 7 is a sequence diagram illustrating an operation of a base station according to Exemplary Embodiment 2.

FIG. 7 is a sequence diagram illustrating an example of a process of transmitting and receiving an uplink signal according to the exemplary embodiment. In FIG. 7, the same processing as in FIG. 5 will be assigned with the same reference marks, and description thereof will be omitted.

At the time of the first transmission illustrated in FIG. 7, in ST31, base station 300 performs synthesis processing for demodulated signal X(BS2,t1) obtained in ST13. The synthesized signal (X(BS2,t1))' is stored in buffer 301.

Similarly to Exemplary Embodiment 1, at the time of the first transmission, the received signal from base station 300 is not forwarded to base station 100.

At the time of retransmission, in ST32, base station 300 performs synthesis processing for stored signal (X(BS2,t1))' in ST31 and demodulated signal X(BS2,t2) obtained in ST23. Synthesized signal (X(BS2,t1)+X(BS2,t2))' is stored in buffer 301.

Since a forwarding request message is received in ST18, base station 300 forwards synthesized signal (X(BS2,t1)+X(BS2,t2))' obtained in ST32 to base station 100 in ST74. That is, base station 100 receives a signal obtained by synthesizing the signals that have been received at the times of the first transmission and retransmission in base station 300 as a forwarded signal.

In ST75, base station 100 performs synthesis processing using demodulated signal X(BS1,t2) obtained in ST22, signal (X(BS2,t1)+X(BS2,t2))' forwarded from base station 300 in ST74, and signal (X(BS1,t1))' stored at the time of the first transmission, obtaining synthesized signal (X(BS1,t1)+X(BS1,t2)+X(BS2,t1)+X(BS2,t2))'.

As described above, base station 300 which is a forwarding base station performs synthesis processing each time it receives an uplink signal transmitted from the terminal, and stores the resulting synthesized signal to buffer 301. Then, in a case where there is a forwarding request from base station 100, base station 300 forwards the synthesized signal.

In this way base station 100 is capable of performing synthesis processing in which the information of all uplink signals received in base station 300 is reflected. Specifically in FIG. 5 of Exemplary Embodiment 1, in the synthesis processing at the time of retransmission in base station 100, signals (X(BS1,t1)+X(BS1,t2)+X(BS2,t2)) are used except for received signal X(BS2,t1) of the forwarding base station at the time of the first transmission. In contrast, in FIG. 7 of the exemplary embodiment, in the synthesis processing at the time of retransmission in base station 100, all received signals (X(BS1,t1)+X(BS2,t1)+X(BS1,t2)+X(BS2,t2)) received in base station 100 and base station 300 are used.

Further, every time buffer 301 of base station 300 receives an uplink signal transmitted from the terminal, buffer 301 synthesizes a signal received at this time with the synthesized signals generated by the signals that have been received up to the previous time to generate a new synthesized signal. Then, base station 300 reads the synthesized signal from buffer 301 and forwards the synthesized signal to base station 100. That is, the size of the synthesized signal read from buffer 301 (forwarding count) is constant regardless of the number of times of synthesis processing in base station 300 (for example, the number of times of retransmission of a terminal).

For example, at the time of retransmission as shown in FIG. 7, as for the signal forwarded from base station 300, the size of a forwarded signal (forwarding count) is equivalent to the size necessary for one time forwarding regardless of whether received signal X(BS1,t2) at the time of the first transmission and received signal X(BS2,t2) at the time of retransmission are included. That is, the size of the forwarded signal is only half the size necessary for forwarding signals X(BS1,t2) and X(BS2,t2) before they are synthesized. In other words, in the exemplary embodiment, as compared with Exemplary Embodiment 1, information by the total number of times of retransmission is forwarded with a comparable size of the forwarded signal. Therefore, base station 300 forwards synthesized signals for a plurality of transmission times to base station 100 with the forwarding count equivalent to the count per one time forwarding.

As described above, in buffer 301 of base station 300 in the exemplary embodiment, the information of the received uplink signals is compressed by synthesizing the uplink signals transmitted from terminals. Thus, in the exemplary embodiment, as compared with Exemplary Embodiment 1, it is possible to suppress the increase in the forwarding count from the forwarding base station to the synthesizing base station while increasing the effect of improving reception quality by synthesis processing in the synthesizing base station.

Further, according to the exemplary embodiment, as in Exemplary Embodiment 1, since base station 300 does not forward the received signal that base station 300 has received at the time of the first transmission of the terminal, it is possible to reduce the signal forwarding count.

According to the exemplary embodiment, it is possible to further increase the effect of improving reception quality by application of CoMP while reducing the signal forwarding count when CoMP is applied.

The exemplary embodiment according to one aspect of the disclosure has been described above.

Modification Example of Exemplary Embodiment

[1] In the above exemplary embodiments, as a criterion for determining necessity of forwarding, a case of using an error detection result (ACK/NACK) is described, but parameters used for the criterion for determining necessity of forwarding are not limited to the error detection result.

For example, as a criterion for determining necessity of forwarding, reception quality between a terminal in an uplink and base station 100 which is a synthesizing base station (CQI: Channel Quality Indicator) may be used. Specifically in a case where the reception quality between the terminal and base station 100 is less than a predetermined threshold value, determination circuit 105 of base station 100 determines that the uplink signal transmitted from the terminal is less likely to be received successfully; and requests forwarding of the signal to base station 200.

Further, for example, as a criterion for determining necessity of forwarding, historical statistics may be used. Specifically in a case where a statistics count obtained by performing statistical processing for the received signals of the signals which have been previously received including the received signals of base station 100 at the time of the first transmission is less than the predetermined threshold value determination circuit 105 of base station 100 predicts that signal reception (decoding) at this time of reception processing is a failure, and requests forwarding of the signal to base station 200.

[2] In the above exemplary embodiment, a case in which base station 100 that is a synthesizing base station determines necessity of forwarding has been described, but base station 200 which is a forwarding base station may determine whether or not the forwarding is necessary.

For example, determination circuit 204 of base station 200 may determine necessity of forwarding based on the reception result (error detection result) of the uplink signal to be received by the local base station. Based on historical statistics regarding reception processing, base station 200 may predict a reception success or failure at this time of reception processing, and forwards the received signal to base station 100 in a case where a reception failure is predicted.

In this way, it is unnecessary to transmit a forwarding request message from the synthesizing base station to the forwarding base station as described in the above exemplary embodiment.

[3] In the above exemplary embodiment, a case in which the present invention is configured with hardware has been described as an example, but the present invention may also be implemented by software working together with the hardware.

In addition, each function block used in the description of each of the aforementioned exemplary embodiments may typically be implemented as a Large Scale Integration (LSI) which is an integrated circuit. Those functions may be in individual chips or may in one chip including all or part of the circuits. Here, the LSI may be called an Integrated Circuit (IC), a system LSI, a super LSI, or an ultra LSI depending on the differences in the degree of integration.

In addition, the integrated circuit may be realized by a dedicated circuit or a general-purpose processor, not limited to the LSI. A field programmable gate array (FPGA) which is programmable after LSI manufacturing or a reconfigurable processor in which a connection or setting of a circuit cell in the LSI can be reconfigured may be used.

Furthermore, with progress or variations of semiconductor technology if a technology of an integrated circuit that replaces the LSI technology is introduced, it is also possible to implement the integration of the functional blocks using the technology. Application of biotechnology is also possible.

INDUSTRIAL APPLICABILITY

One aspect of the present disclosure is applicable to a mobile communication system or the like.

REFERENCE MARKS IN THE DRAWINGS 100, 200, 300 base station.
101, 201 inter-terminal communication circuit
102, 202 demodulation circuit
103 synthesis circuit
104 decoding circuit
105, 204 determination circuit
106, 203 base station-to-base station communication circuit
301 buffer

The invention claimed is:

1. A first base station that receives signals transmitted from one terminal in cooperation with a second base station and performs synthesis processing of the received signals of the second base station and the received signals of the first base station, the first base station comprising:
   a determination circuit that determines that the synthesis processing is necessary in a case where there is an error in a result of decoding of the received signals of the first base station at the time of the first transmission of the terminal;
   a communication circuit that transmits to the terminal a Negative Acknowledgement (NACK) indicating that there is the error in the result of decoding, and transmits to the second base station a message requesting forwarding of the received signals in a case where the synthesis processing is determined to be necessary, and receives the forwarded signals that are forwarded from the second base station at the time of retransmission of the terminal; and
   a synthesis circuit that synthesizes the forwarded signals from the second base station and the received signals of the first base station in a case where the synthesis processing is determined to be necessary,
   wherein the forwarded signals are obtained by synthesizing signals that have been received at the second base station from the first transmission until the current retransmission.

2. The base station of claim 1, wherein the forwarded signal is a logarithm likelihood ratio that is calculated from the signal received at the second base station.

3. A base station that receives signals transmitted from one terminal in cooperation with a plurality of base stations and forwards the received signals of the base station to a synthesizing base station that performs synthesis processing of the received signals among the plurality of base stations, the base station comprising:

a demodulation circuit that demodulates the signals transmitted from the terminal; and a communication circuit that forwards the demodulated signals to the synthesizing base station in a case where a message requesting forwarding of the received signals is received from the synthesizing base station, wherein the message requesting forwarding of the received signals is transmitted from the synthesizing base station in a case where there is an error in a result of decoding of the received signals of the synthesizing base station at the time of the first transmission of the terminal, and wherein the communication circuit forwards signals obtained by synthesizing signals that have been received at the base station from the first transmission until the current retransmission.

4. A signal synthesis method of a first base station that receives signals transmitted from one terminal in cooperation with the first base station and a second base station, and performs synthesis processing of the received signals of the second base station and the received signals of the first base station, the method comprising:

determining that the synthesis processing is necessary in a case where there is an error in a result of decoding of the received signals of the first base station at the time of the first transmission of the terminal;

transmitting to the terminal a NACK indicating that there is the error in the result of decoding, transmitting a message requesting forwarding of the received signals to the second base station in a case where the synthesis processing is determined to be necessary, and receiving the forwarded signals that are forwarded from the second base station at the time of retransmission; and synthesizing the forwarded signals from the second base station and the received signals of the first base station in a case where the synthesis processing is determined to be necessary, wherein the forwarded signals are obtained by synthesizing signals that have been received at the second base station from the first transmission until the current retransmission.

5. A signal forwarding method of a base station that receives signals transmitted from one terminal in cooperation with a plurality of base stations, and forwards the received signals of the base station to a synthesizing base station that performs synthesis processing of the received signals among the plurality of base stations, the method comprising:

demodulating the signals transmitted from the terminal; and forwarding the demodulated signals to the synthesizing base station in a case where a message requesting forwarding of the received signals is received from the synthesizing base station, wherein the message requesting forwarding of the received signals is transmitted from the synthesizing base station in a case where there is an error in a result of decoding of the received signals of the synthesizing base station at the time of the first transmission of the terminal, and in the forwarding, signals obtained by synthesizing signals that have been received at the base station from the first transmission until the current retransmission are forwarded.

\* \* \* \* \*